(12) United States Patent
Matsubayashi

(10) Patent No.: US 11,236,238 B2
(45) Date of Patent: Feb. 1, 2022

(54) CONDUCTIVE POLYMER DISPERSION AND METHOD FOR PREPARING SAME, AND METHOD FOR MANUFACTURING CONDUCTIVE FILM

(71) Applicant: Shin-Etsu Polymer Co., Ltd., Tokyo (JP)

(72) Inventor: Sou Matsubayashi, Kitaadachi-gun (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 66 days.

(21) Appl. No.: 16/750,000

(22) Filed: Jan. 23, 2020

(65) Prior Publication Data

US 2020/0181431 A1 Jun. 11, 2020

Related U.S. Application Data

(63) Continuation of application No. 16/068,106, filed as application No. PCT/JP2017/000586 on Jan. 11, 2017, now Pat. No. 10,647,858.

(30) Foreign Application Priority Data

Jan. 12, 2016 (JP) .............................. JP2016-003759

(51) Int. Cl.
*H01B 1/12* (2006.01)
*C09D 5/24* (2006.01)
(Continued)

(52) U.S. Cl.
CPC ............. *C09D 5/24* (2013.01); *C08G 61/126* (2013.01); *C08K 5/3477* (2013.01);
(Continued)

(58) Field of Classification Search
CPC ... C08K 5/3477; C08K 5/34924; C08L 25/18; C08L 65/00; C08L 67/00; C08L 101/12; C09D 165/00; C09D 167/00; C09D 175/12; C09D 5/24; C09D 7/20; C09D 7/63; C08G 2261/135; C08G 2261/3223;
(Continued)

(56) References Cited

U.S. PATENT DOCUMENTS 5,552,216 A * 9/1996 Sugimoto ................ C09D 5/24
252/500
2006/0202171 A1 9/2006 Yoshida et al.
(Continued)

FOREIGN PATENT DOCUMENTS

JP 2013-54599 A 3/2013
JP 2013-87202 A 5/2013
(Continued)

OTHER PUBLICATIONS

International Search Report in PCT Application No. PCT/JP2017/000586, dated Apr. 18, 2017, 5pp.

*Primary Examiner* — Mark Kopec
*Assistant Examiner* — Jaison P Thomas
(74) *Attorney, Agent, or Firm* — Hauptman Ham, LLP

(57) ABSTRACT

A conductive polymer dispersion of this disclosure includes: a conductive composite containing a n-conjugated conductive polymer and a polyanion; an isocyanurate-based compound; and a dispersion medium for dispersing the conductive composite.

16 Claims, 1 Drawing Sheet

(51) Int. Cl.

| | |
|---|---|
| *C08K 5/3492* | (2006.01) |
| *C09D 7/63* | (2018.01) |
| *C08G 61/12* | (2006.01) |
| *C08L 65/00* | (2006.01) |
| *H01B 13/00* | (2006.01) |
| *C08L 101/12* | (2006.01) |
| *C08K 5/3477* | (2006.01) |
| *C09D 7/20* | (2018.01) |
| *C09D 165/00* | (2006.01) |
| *C09D 167/00* | (2006.01) |
| *C09D 175/12* | (2006.01) |

(52) U.S. Cl.
CPC ........ *C08K 5/34924* (2013.01); *C08L 65/00* (2013.01); *C08L 101/12* (2013.01); *C09D 7/20* (2018.01); *C09D 7/63* (2018.01); *C09D 165/00* (2013.01); *C09D 167/00* (2013.01); *C09D 175/12* (2013.01); *H01B 1/12* (2013.01); *H01B 1/124* (2013.01); *H01B 13/00* (2013.01); *H01B 13/0036* (2013.01); *C08G 2261/135* (2013.01); *C08G 2261/3223* (2013.01); *C08G 2261/51* (2013.01); *C08G 2261/59* (2013.01); *C08G 2261/64* (2013.01); *C08G 2261/72* (2013.01); *C08G 2261/76* (2013.01)

(58) Field of Classification Search
CPC ............ C08G 2261/51; C08G 2261/59; C08G 2261/64; C08G 2261/72; C08G 2261/76; C08G 61/126; H01B 13/00; H01B 13/0036; H01B 1/12; H01B 1/124
See application file for complete search history.

(56) References Cited

U.S. PATENT DOCUMENTS

| | | | |
|---|---|---|---|
| 2007/0096066 A1* | 5/2007 | Yoshida | ............ H01G 9/028 252/511 |
| 2010/0252782 A1 | 10/2010 | Masahiro | |
| 2011/0135939 A1 | 6/2011 | Isaji et al. | |
| 2015/0218410 A1 | 8/2015 | Matsubayashi et al. | |
| 2015/0348670 A1 | 12/2015 | Fujiki et al. | |
| 2015/0348671 A1 | 12/2015 | Fujiki et al. | |
| 2016/0086684 A1 | 3/2016 | Sakuta et al. | |
| 2018/0010017 A1 | 1/2018 | Matsubayashi et al. | |

FOREIGN PATENT DOCUMENTS

| | | |
|---|---|---|
| JP | 5509462 B2 | 6/2014 |
| JP | 2015-212361 A | 11/2015 |
| JP | 2015-212362 A | 11/2015 |
| JP | 2016-74884 A | 5/2016 |
| TW | 201343822 A | 11/2013 |
| TW | 201600578 A | 1/2016 |
| WO | 2014/125826 A1 | 8/2014 |
| WO | 2014/125827 A1 | 8/2014 |
| WO | 2015/080195 A1 | 6/2015 |

* cited by examiner

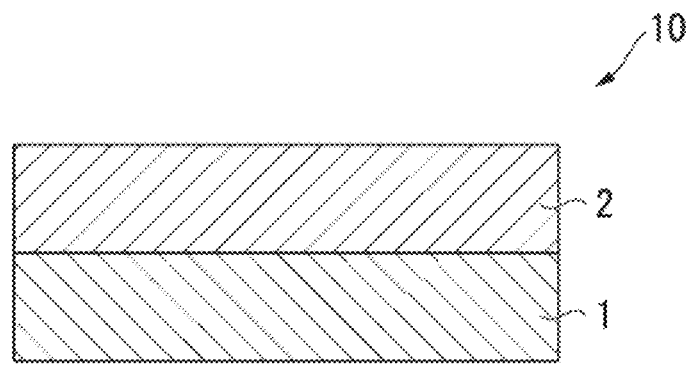

CONDUCTIVE POLYMER DISPERSION AND METHOD FOR PREPARING SAME, AND METHOD FOR MANUFACTURING CONDUCTIVE FILM

The present application is a Continuation application of U.S. application Ser. No. 16/068,106, filed Jul. 3, 2018, which is a National Phase of International Application Number PCT/JP2017/000586, filed Jan. 11, 2017, which claims priority to Japanese Patent Application No. 2016-003759, filed on Jan. 12, 2016, the contents of which are incorporated herein by reference in their entirety.

TECHNICAL FIELD

Background Art

A π-conjugated conductive polymer, which has a main chain formed of a π-conjugated system, expresses conductivity and exhibits water dispersibility when doped with a polyanion having anion groups. Accordingly, through application of a conductive polymer dispersion containing the n-conjugated conductive polymer and the polyanion to a film base material or the like, a conductive film having a conductive layer can be manufactured.

However, the conductive layer of the conductive film may undergo a temporal decrease in conductivity in the atmosphere.

As a method of preventing the temporal decrease in conductivity in the atmosphere, there is a proposal of a method involving incorporating an antioxidant into the conductive layer (Patent Literature 1).

CITATION LIST

Patent Literature

[PTL 1] JP 5509462 B2

SUMMARY OF INVENTION

Technical Problem

However, even the method described in Patent Literature 1 cannot sufficiently suppress the temporal decrease in conductivity of the conductive layer in the atmosphere in some cases. In addition, the antioxidant is a nonconductive compound. Accordingly, when the content of the antioxidant in the conductive layer is increased, the content ratio of the n-conjugated conductive polymer is reduced, with the result that basic conductivity may be decreased.

An object of this disclosure is to provide a conductive polymer dispersion that can easily form a conductive layer having its temporal decrease in conductivity in the atmosphere sufficiently suppressed and having high basic conductivity, and a method of producing the same.

Another object of this disclosure is to provide a method of manufacturing a conductive film by which a conductive film having its temporal decrease in conductivity in the atmosphere sufficiently suppressed and having high basic conductivity can easily be manufactured.

Solution to Problem

This disclosure provides the following aspects.
[1] A conductive polymer dispersion, including:
    a conductive composite containing a n-conjugated conductive polymer and a polyanion;
    an isocyanurate-based compound represented by the following formula (1); and
    a dispersion medium for dispersing the conductive composite.
(In the formula (1), $R^1$, $R^2$, and $R^3$ each independently represent a hydrogen atom or any substituent.)

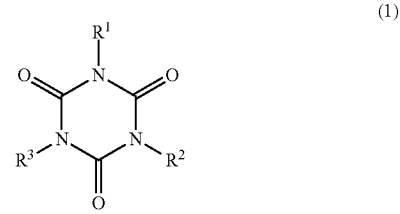

(1)

[2] A conductive polymer dispersion according to Item [1], further including an amine compound, wherein the dispersion medium contains an organic solvent.
[3] A conductive polymer dispersion according to Item [1], further including an epoxy compound, wherein the dispersion medium contains an organic solvent.
[4] A conductive polymer dispersion according to Item [1] or [2], further including a binder component.
[5] A conductive polymer dispersion according to Item [4], wherein the binder component includes a water-dispersible resin.
[6] A conductive polymer dispersion according to Item [4], wherein the binder component includes an acrylic monomer or an acrylic oligomer.
[7] A conductive polymer dispersion according to Item [4], wherein the binder component includes a curable silicone.
[8] A conductive polymer dispersion according to any one of Items [1] to [7], wherein the n-conjugated conductive polymer includes poly(3,4-ethylenedioxythiophene).
[9] A conductive polymer dispersion according to any one of Items [1] to [8], wherein the polyanion includes polystyrene sulfonic acid.
[10] A method of producing a conductive polymer dispersion, including an isocyanurate-based compound addition step (a) of adding an isocyanurate-based compound represented by the formula (1) to an aqueous dispersion of a conductive composite containing a n-conjugated conductive polymer and a polyanion.
[11] A method of producing a conductive polymer dispersion, including: a drying step of drying an aqueous dispersion of a conductive composite containing a n-conjugated conductive polymer and a polyanion to obtain a dried product; a conductive mixed liquid preparation step (b) of adding an amine compound and an organic solvent to the dried product to prepare a conductive mixed liquid; and an isocyanurate-based compound addition step (b) of adding an isocyanurate-based compound represented by the formula (1) to the conductive mixed liquid.
[12] A method of producing a conductive polymer dispersion, including: a precipitation step of adding an epoxy compound to an aqueous dispersion of a conductive composite containing a n-conjugated conductive polymer and a polyanion to precipitate the conductive composite, to thereby form a precipitate; a collection step of collecting the precipitate; a conductive mixed liquid preparation step (c) of adding an organic solvent to the collected precipitate to prepare a conductive mixed liquid; and an isocyanurate-based compound addition step (c) of adding an isocyanurate-based compound represented by the formula (1) to the conductive mixed liquid.

[13] A method of producing a conductive polymer dispersion according to any one of Items [10] to [12], wherein the n-conjugated conductive polymer includes poly(3,4-ethylenedioxythiophene).

[14] A method of producing a conductive polymer dispersion according to any one of Items [10] to [13], wherein the polyanion includes polystyrene sulfonic acid.

[15] A method of manufacturing a conductive film, including an application step of applying the conductive polymer dispersion of any one of Items [1] to [9] to at least one surface of a film base material.

Advantageous Effects of Invention

According to the conductive polymer dispersion of this disclosure, a conductive layer having its temporal decrease in conductivity in the atmosphere sufficiently suppressed and having high basic conductivity can easily be formed.

According to the method of producing a conductive polymer dispersion of this disclosure, the above-mentioned conductive polymer dispersion can easily be produced.

According to the method of manufacturing a conductive film of this disclosure, a conductive film having its temporal decrease in conductivity in the atmosphere sufficiently suppressed and having high basic conductivity can easily be manufactured.

BRIEF DESCRIPTION OF DRAWINGS

FIG. 1 is a cross-sectional view for illustrating an example of a conductive film of this disclosure.

DESCRIPTION OF EMBODIMENTS

Conductive Polymer Dispersion

A conductive polymer dispersion in one aspect of this disclosure contains: a conductive composite containing a π-conjugated conductive polymer and a polyanion; an isocyanurate-based compound; and a dispersion medium for dispersing the conductive composite.

The conductive polymer dispersion may contain a binder component or any other additive as required.

The π-conjugated conductive polymer may be any organic polymer having a main chain formed of a π-conjugated system without any particular limitation as long as the effects of this disclosure are provided. Examples thereof include a polypyrrole-based conductive polymer, a polythiophene-based conductive polymer, a polyacetylene-based conductive polymer, a polyphenylene-based conductive polymer, a polyphenylene vinylene-based conductive polymer, a polyaniline-based conductive polymer, a polyacene-based conductive polymer, a polythiophene vinylene-based conductive polymer, and copolymers thereof. From the viewpoint of stability in air, a polypyrrole-based conductive polymer, a polythiophene-based conductive polymer, and a polyaniline-based conductive polymer are preferred, and in terms of transparency, a polythiophene-based conductive polymer is more preferred.

Examples of the polythiophene-based conductive polymer include polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butylenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), and poly(3-methyl-4-carboxybutylthiophene).

Examples of the polypyrrole-based conductive polymer include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), and poly(3-methyl-4-hexyloxypyrrole).

Examples of the polyaniline-based conductive polymer include polyaniline, poly(2-methylaniline), poly(3-isobutylaniline), poly(2-anilinesulfonic acid), and poly(3-anilinesulfonic acid).

Of the above-mentioned π-conjugated conductive polymers, poly(3,4-ethylenedioxythiophene) is particularly preferred from the viewpoints of conductivity, transparency, and heat resistance.

The π-conjugated conductive polymers may be used alone or in combination thereof.

The polyanion is a polymer having, in the molecule, two or more monomer units each having an anion group. The anion groups of the polyanion function as dopants for the π-conjugated conductive polymer to improve the conductivity of the π-conjugated conductive polymer.

The anion groups of the polyanion are each preferably a sulfo group or a carboxy group.

Specific examples of such polyanion include: polymers each having a sulfonic acid group, such as polystyrene sulfonic acid, polyvinyl sulfonic acid, polyallyl sulfonic acid, polyacrylic sulfonic acid, polymethacrylic sulfonic acid, poly(2-acrylamide-2-methylpropanesulfonic acid), polyisoprene sulfonic acid, polysulfoethyl methacrylate, poly(4-sulfobutyl methacrylate), and polymethacryloxybenzenesulfonic acid; and polymers each having a carboxylic acid group, such as polyvinyl carboxylic acid, polystyrene carboxylic acid, polyallyl carboxylic acid, polyacrylic carboxylic acid, polymethacrylic carboxylic acid, poly(2-acrylamide-2-methylpropanecarboxylic acid), polyisoprene carboxylic acid, and polyacrylic acid. The polyanion may be any one of those homopolymers, or may be a copolymer of two or more kinds thereof.

Of those polyanions, in order that an antistatic property can be further enhanced, a polymer having a sulfonic acid group is preferred, and polystyrene sulfonic acid is more preferred.

The polyanions may be used alone or in combination thereof.

The mass-average molecular weight of the polyanion is preferably 20,000 or more and 1,000,000 or less, more preferably 100,000 or more and 500,000 or less.

Herein, the mass-average molecular weight is a value determined through measurement by gel permeation chromatography using polystyrene as a standard substance.

The content ratio of the polyanion in the conductive composite falls within preferably the range of from 1 part by mass or more to 1,000 parts by mass or less, more preferably the range of from 10 parts by mass or more to 700 parts by mass or less, still more preferably the range of from 100 parts by mass or more to 500 parts by mass or less with respect to 100 parts by mass of the π-conjugated conductive polymer. When the content ratio of the polyanion is equal to or larger than the above-mentioned lower limit value, its doping effect on the π-conjugated conductive polymer can be prevented from weakening, to thereby prevent lack of conductivity, and moreover, the dispersibility of the conductive composite in the conductive polymer dispersion can be enhanced. Meanwhile, when the content of the polyanion is equal to or smaller than the above-mentioned upper limit value, a reduction in content of the π-conjugated conductive polymer can be prevented, to thereby provide sufficient conductivity.

The content ratio of the polyanion is preferably from 1 mass % to 90 mass %, more preferably from 10 mass % to 80 mass % with respect to the total mass of the conductive composite.

The polyanion is coordinated to the π-conjugated conductive polymer to be doped thereinto, to thereby form the conductive composite.

In this regard, however, not all the anion groups of the polyanion in this aspect are doped into the π-conjugated conductive polymer, and the polyanion has an excess anion group that does not contribute to the doping.

The isocyanurate-based compound is a compound represented by the formula (1). The isocyanurate-based compound has a conductivity-improving function and an antioxidant function.

In the formula (1), $R^1$, $R^2$, and $R^3$ each independently represent a hydrogen atom or any substituent.

Examples of the substituent include alkyl groups each having 1 to 100 carbon atoms (e.g., a methyl group, an ethyl group, a propyl group, and a butyl group), alkoxy groups each having 1 to 100 carbon atoms (e.g., a methoxy group, an ethoxy group, a propoxy group, and a butoxy group), and aryl groups each having 6 to 100 carbon atoms (e.g., a phenyl group). Those substituents may each further have a substituent (e.g., a (meth)acryloyloxy group, a carboxy group, a hydroxy group, an epoxy group, an amino group, or a trialkoxysilyl group). The number of carbon atoms of each of the alkyl groups, the alkoxy groups, and the aryl groups does not include the number of carbon atoms of the substituent. Of those, an alkyl group having a substituent is preferred as the substituent.

Specific examples of the isocyanurate-based compound include tris(2-carboxyethyl)isocyanurate, tris(2-acryloyloxyethyl)isocyanurate, tris(2-hydroxyethyl)isocyanurate, triallyl isocyanurate, triglycidyl isocyanurate, and tris(3-trimethoxysilylpropyl)isocyanurate.

The isocyanurate-based compounds may be used alone or in combination thereof.

The content of the isocyanurate-based compound is preferably 1 part by mass or more and 10,000 parts by mass or less, more preferably 5 parts by mass or more and 5,000 parts by mass or less, still more preferably 10 parts by mass or more and 1,000 parts by mass or less with respect to 100 parts by mass of the conductive composite. When the content of the isocyanurate-based compound is equal to or larger than the above-mentioned lower limit value, the conductivity of a conductive layer can be further improved, and a decrease in conductivity in the atmosphere can be further suppressed. Meanwhile, when the content of the isocyanurate-based compound is equal to or smaller than the above-mentioned upper limit value, a decrease in conductivity due to a decrease in content ratio of the conductive composite can be suppressed.

The dispersion medium in this aspect is a liquid for dispersing the conductive composite, and is water, an organic solvent, or a mixed liquid of water and an organic solvent. Herein, the term "disperse" means that a compound is scattered in a state of fine particles in the dispersion medium. The isocyanurate-based compound, an amine compound, an epoxy compound, and the binder component are dissolved or dispersed in the dispersion medium.

Examples of the organic solvent include an alcohol-based solvent, an ether-based solvent, a ketone-based solvent, an ester-based solvent, and an aromatic hydrocarbon-based solvent. Those organic solvents may be used alone or in combination thereof.

Examples of the alcohol-based solvent include methanol, ethanol, isopropanol, n-butanol, t-butanol, and allyl alcohol.

Examples of the ether-based solvent include diethyl ether, dimethyl ether, ethylene glycol, propylene glycol, a propylene glycol monoalkyl ether, such as propylene glycol monomethyl ether, and a propylene glycol dialkyl ether.

Examples of the ketone-based solvent include diethyl ketone, methyl propyl ketone, methyl butyl ketone, methyl isopropyl ketone, methyl isobutyl ketone, methyl amyl ketone, diisopropyl ketone, methyl ethyl ketone, acetone, and diacetone alcohol.

Examples of the ester-based solvent include ethyl acetate, propyl acetate, and butyl acetate.

Examples of the aromatic hydrocarbon-based solvent include benzene, toluene, xylene, ethylbenzene, propylbenzene, and isopropylbenzene.

The binder component is a compound other than the π-conjugated conductive polymer and the polyanion, and is a thermoplastic resin, or a curable monomer or oligomer to be cured in the formation of a conductive layer. The thermoplastic resin itself serves as a binder resin, and the curable monomer or oligomer is cured to form a resin that serves as a binder resin.

The binder components may be used alone or in combination thereof.

Specific examples of the binder resin derived from the binder component include an acrylic resin, a polyester resin, a polyurethane resin, a polyimide resin, a polyether resin, a melamine resin, and a silicone.

When the binder component is the thermoplastic resin, the binder resin is preferably a water-dispersible resin capable of being dispersed in the conductive polymer dispersion. The water-dispersible resin is an emulsion resin or a water-soluble resin.

Specific examples of the emulsion resin include an acrylic resin, a polyester resin, a polyurethane resin, a polyimide resin, and a melamine resin each of which is emulsified by an emulsifier.

In addition, examples of the water-soluble resin include an acrylic resin, a polyester resin, a polyurethane resin, a polyimide resin, and a melamine resin each of which has an acid group, such as a carboxy group or a sulfo group, or a salt thereof. Herein, the term "water-soluble" means that 1 mass % or more, preferably 5 mass % or more, more preferably 10 mass % or more of the resin is dissolved in distilled water at 25° C. with respect to the total mass of an aqueous solution to be obtained.

The curable monomer or oligomer may be a thermosetting monomer or oligomer, or may be a photocurable monomer or oligomer. Herein, the monomer refers to a monomer for forming a polymer. The oligomer refers to a polymer having a mass-average molecular weight of 100 or more and less than 10,000. A polymer having a mass-average molecular weight of more than 10,000 does not have curability.

Examples of the curable monomer include an acrylic monomer, an epoxy monomer, and an organosiloxane. Examples of the acrylic monomer include monofunctional monomers and polyfunctional monomers, such as: acrylates, such as bisphenol A-ethylene oxide-modified diacrylate, dipentaerythritol hexa(penta)acrylate, dipentaerythritol monohydroxypentaacrylate, dipropylene glycol diacrylate, trimethylolpropane triacrylate, glycerin propoxy triacrylate, 4-hydroxybutyl acrylate, 1,6-hexanediol diacrylate, 2-hydroxyethyl acrylate, 2-hydroxypropyl acrylate, isobornyl acrylate, polyethylene glycol diacrylate, pentaerythritol triacrylate, tetrahydrofurfuryl acrylate, trimethylolpropane triacrylate, and tripropylene glycol diacrylate; methacrylates, such as tetraethylene glycol dimethacrylate, an alkyl methacrylate, allyl methacrylate, 1,3-butylene glycol dimethacrylate, n-butyl methacrylate, benzyl methacrylate, cyclohexyl methacrylate, diethylene glycol dimethacrylate, 2-ethylhexyl methacrylate, glycidyl methacrylate, 1,6-hexanediol dimethacrylate, 2-hydroxyethyl methacrylate, isobornyl methacrylate, lauryl methacrylate, phenoxyethyl methacrylate, t-butyl methacrylate, tetrahydrofurfuryl methacrylate, and trimethylolpropane trimethacrylate; acryl(methacryl) amides, such as diacetone acrylamide, N,N-dimethylacrylamide, dimethylaminopropyl acrylamide, dimethylaminopropyl methacrylamide, methacrylamide, N-methylolacrylamide, N,N-dimethylacrylamide, acryloylmorpholine, N-vinylformamide, N-methylacrylamide, N-isopropylacrylamide, N-t-butylacrylamide, N-phenylacrylamide, acryloylpiperidine, and 2-hydroxyethylacrylamide; vinyl ethers, such as 2-chloroethylvinyl ether, cyclohexylvinyl ether, ethyl vinyl ether, hydroxybutylvinyl ether, isobutyl vinyl ether, and triethylene glycol vinyl ether; and carboxylic acid vinyl esters, such as vinyl butyrate, vinyl monochloroacetate, and vinyl pivalate. Examples of the curable oligomer include an acrylic oligomer, an epoxy oligomer, and a silicone oligomer (curable silicone). Examples of the acrylic oligomer include an acrylic oligomer obtained by polymerizing the above-mentioned acrylic monomer, and an acrylic oligomer obtained by urethanation of the monomer through a reaction with an isocyanate. Examples of the curable silicone include an addition-curable silicone, a condensation-curable silicone, and a UV-curable silicone.

When the acrylic monomer or the acrylic oligomer is used as the binder component, curing can easily be performed by heating or photoirradiation. When the organosiloxane or the silicone oligomer is used as the binder component, releasability can be imparted to the conductive layer.

The addition of an antioxidant may cause inhibition of the curing of an addition-curable organosiloxane or silicone oligomer. However, the isocyanurate-based compound hardly inhibits the curing of the addition-curable organosiloxane or silicone oligomer, and hence is suitable when the addition-curable organosiloxane or silicone oligomer is used as the binder component.

When the curable monomer or oligomer is used, a curing catalyst is preferably added. For example, when the thermosetting monomer or oligomer is used, a thermal polymerization initiator for generating a radical through heating is preferably added, and when the photocurable monomer or oligomer is used, a photopolymerization initiator for generating a radical through photoirradiation is preferably used. In addition, when the organosiloxane or the silicone oligomer is used, a platinum catalyst for curing is preferably used.

The content ratio of the binder component is preferably 100 parts by mass or more and 10,000 parts by mass or less, more preferably 100 parts by mass or more and 5,000 parts by mass or less, still more preferably 100 parts by mass or more and 1,000 parts by mass or less with respect to 100 parts by mass of the solid content (non-volatile content) of the conductive composite. When the content ratio of the binder component is equal to or larger than the above-mentioned lower limit value, film formability and film strength can be improved. When the content ratio of the binder component is equal to or smaller than the above-mentioned upper limit value, a decrease in content ratio of the conductive composite can be prevented, to thereby prevent a decrease in conductivity.

The conductive polymer dispersion may contain a known additive.

As the additive, which is not particularly limited as long as the effects of this disclosure are provided, for example, a surfactant, an inorganic conductive agent, a defoamer, a coupling agent, an antioxidant, or a UV absorber may be used. The additive is formed of a compound other than the polyanion, the isocyanurate-based compound, and the binder component.

Examples of the surfactant include nonionic, anionic, and cationic surfactants. Of those, a nonionic surfactant is preferred in terms of storage stability. In addition, a polymer-based surfactant, such as polyvinyl alcohol or polyvinylpyrrolidone, may be added.

Examples of the inorganic conductive agent include metal ions and conductive carbon. The metal ions may each be generated by dissolving a metal salt in water.

Examples of the defoamer include a silicone resin, polydimethylsiloxane, and a silicone oil.

Examples of the coupling agent include silane coupling agents each having a vinyl group, an amino group, an epoxy group, or the like.

Examples of the antioxidant include a phenol-based antioxidant, an amine-based antioxidant, a phosphorus-based antioxidant, a sulfur-based antioxidant, and saccharides. The conductive polymer dispersion according to this aspect may not contain the antioxidant because the isocyanurate-based compound can suppress a temporal decrease in conductivity of the conductive layer in the atmosphere.

Examples of the UV absorber include a benzotriazole-based UV absorber, a benzophenone-based UV absorber, a salicylate-based UV absorber, a cyanoacrylate-based UV absorber, an oxanilide-based UV absorber, a hindered amine-based UV absorber, and a benzoate-based UV absorber.

When the conductive polymer dispersion contains the additive, its content ratio is appropriately determined depending on the kind of the additive, and generally falls within the range of from 0.001 part by mass or more to 5 parts by mass or less with respect to 100 parts by mass of the solid content of the conductive composite.

As a result of an investigation made by the inventor of this disclosure, it has been found that a conductive layer formed from the conductive polymer dispersion containing the isocyanurate-based compound has its temporal decrease in conductivity in the atmosphere sufficiently suppressed, and moreover, has high basic conductivity. This is presumably because the isocyanurate-based compound has both an antioxidant function and a conductivity-improving function.

The conductive polymer dispersion of this disclosure preferably contains: a conductive composite containing a π-conjugated conductive polymer and a polyanion; at least one kind of isocyanurate-based compound selected from the group consisting of tris(2-carboxyethyl)isocyanurate, tris(2-acryloyloxyethyl)isocyanurate, tris(2-hydroxyethyl)isocyanurate, triallyl isocyanurate, triglycidyl isocyanurate, and tris(3-trimethoxysilylpropyl)isocyanurate; and a dispersion medium for dispersing the conductive composite.

The conductive polymer dispersion of this disclosure preferably contains: a conductive composite containing poly(3,4-ethylenedioxythiophene) and polystyrene sulfonic acid; at least one kind of isocyanurate-based compound selected from the group consisting of tris(2-carboxyethyl)isocyanurate, tris(2-acryloyloxyethyl)isocyanurate, tris(2-hydroxyethyl)isocyanurate, triallyl isocyanurate, triglycidyl isocyanurate, and tris(3-trimethoxysilylpropyl)isocyanurate; and at least one kind of dispersion medium selected from the group consisting of an alcohol-based solvent, an ether-based solvent, a ketone-based solvent, an ester-based solvent, and an aromatic hydrocarbon-based solvent.

The conductive polymer dispersion of this disclosure preferably contains: a conductive composite containing a π-conjugated conductive polymer and a polyanion; at least one kind of isocyanurate-based compound selected from the group consisting of tris(2-carboxyethyl)isocyanurate, tris(2-acryloyloxyethyl)isocyanurate, tris(2-hydroxyethyl)isocyanurate, triallyl isocyanurate, triglycidyl isocyanurate, and tris(3-trimethoxysilylpropyl)isocyanurate; a dispersion medium for dispersing the conductive composite; and at least one kind of compound selected from the group consisting of an amine compound, an epoxy compound, and a binder component.

The conductive polymer dispersion of this disclosure preferably contains: a conductive composite containing poly(3,4-ethylenedioxythiophene) and polystyrene sulfonic acid; at least one kind of isocyanurate-based compound selected from the group consisting of tris(2-carboxyethyl)isocyanurate, tris(2-acryloyloxyethyl)isocyanurate, tris(2-hydroxyethyl)isocyanurate, triallyl isocyanurate, triglycidyl isocyanurate, and tris(3-trimethoxysilylpropyl)isocyanurate; a dispersion medium for dispersing the conductive composite; and an amine compound.

The conductive polymer dispersion of this disclosure preferably contains: a conductive composite containing poly(3,4-ethylenedioxythiophene) and polystyrene sulfonic acid; at least one kind of isocyanurate-based compound selected from the group consisting of tris(2-carboxyethyl)isocyanurate, tris(2-acryloyloxyethyl)isocyanurate, tris(2-hydroxyethyl)isocyanurate, triallyl isocyanurate, triglycidyl isocyanurate, and tris(3-trimethoxysilylpropyl)isocyanurate; at least one kind of dispersion medium selected from the group consisting of an alcohol-based solvent, an ether-based solvent, a ketone-based solvent, an ester-based solvent, and an aromatic hydrocarbon-based solvent; and at least one kind of amine compound selected from the group consisting of tributylamine and trioctylamine.

The conductive polymer dispersion of this disclosure preferably contains: a conductive composite containing poly(3,4-ethylenedioxythiophene) and polystyrene sulfonic acid; at least one kind of isocyanurate-based compound selected from the group consisting of tris(2-carboxyethyl)isocyanurate, tris(2-acryloyloxyethyl)isocyanurate, tris(2-hydroxyethyl)isocyanurate, triallyl isocyanurate, triglycidyl isocyanurate, and tris(3-trimethoxysilylpropyl)isocyanurate; at least one kind of dispersion medium selected from the group consisting of an alcohol-based solvent, an ether-based solvent, a ketone-based solvent, an ester-based solvent, and an aromatic hydrocarbon-based solvent; and an epoxy compound.

The conductive polymer dispersion of this disclosure preferably contains: a conductive composite containing poly(3,4-ethylenedioxythiophene) and polystyrene sulfonic acid; at least one kind of isocyanurate-based compound selected from the group consisting of tris(2-carboxyethyl)isocyanurate, tris(2-acryloyloxyethyl)isocyanurate, tris(2-hydroxyethyl)isocyanurate, triallyl isocyanurate, triglycidyl isocyanurate, and tris(3-trimethoxysilylpropyl)isocyanurate; a dispersion medium for dispersing the conductive composite; and a binder component.

The conductive polymer dispersion of this disclosure preferably contains: a conductive composite containing poly(3,4-ethylenedioxythiophene) and polystyrene sulfonic acid; at least one kind of isocyanurate-based compound selected from the group consisting of tris(2-carboxyethyl)isocyanurate, tris(2-acryloyloxyethyl)isocyanurate, tris(2-hydroxyethyl)isocyanurate, triallyl isocyanurate, triglycidyl isocyanurate, and tris(3-trimethoxysilylpropyl)isocyanurate; at least one kind of dispersion medium selected from the group consisting of an alcohol-based solvent, an ether-based solvent, a ketone-based solvent, an ester-based solvent, and an aromatic hydrocarbon-based solvent; and at least one kind of binder component selected from the group consisting of an acrylic resin, a polyester resin, a polyurethane resin, a polyimide resin, a polyether resin, a melamine resin, and silicone.

The conductive polymer dispersion of this disclosure preferably contains: a conductive composite containing poly(3,4-ethylenedioxythiophene) and polystyrene sulfonic acid; at least one kind of isocyanurate-based compound selected from the group consisting of tris(2-carboxyethyl)isocyanurate, tris(2-acryloyloxyethyl)isocyanurate, tris(2-hydroxyethyl)isocyanurate, triallyl isocyanurate, triglycidyl isocyanurate, and tris(3-trimethoxysilylpropyl)isocyanurate; at least one kind of dispersion medium selected from the group consisting of an alcohol-based solvent, an ether-based solvent, a ketone-based solvent, an ester-based solvent, and an aromatic hydrocarbon-based solvent; and at least one kind of binder component selected from the group consisting of an acrylic resin, a polyester resin, a polyurethane resin, a polyimide resin, a polyether resin, a melamine resin, and a silicone, and has a content of the isocyanurate-based compound of 1 part by mass or more and 10,000 parts by mass or less with respect to 100 parts by mass of the conductive composite.

<Method of producing Conductive Polymer Dispersion>

The conductive polymer dispersion according to this aspect may be produced by any one of the following methods (a) to (c).

(a) A method including an isocyanurate-based compound addition step (a) of adding the isocyanurate-based compound to an aqueous dispersion of a conductive composite containing a π-conjugated conductive polymer and a polyanion.

(b) A method including: a drying step of drying an aqueous dispersion of a conductive composite containing a π-conjugated conductive polymer and a polyanion to obtain a dried product; a conductive mixed liquid preparation step (b) of adding an amine compound and an organic solvent to the dried product to prepare a conductive mixed liquid; and an isocyanurate-based compound addition step (b) of adding the isocyanurate-based compound to the conductive mixed liquid.

(c) A method including: a precipitation step of adding an epoxy compound to an aqueous dispersion of a conductive composite containing a π-conjugated conductive polymer and a polyanion to precipitate the conductive composite, to thereby form a precipitate; a collection step of collecting the precipitate; a conductive mixed liquid preparation step (c) of adding an organic solvent to the collected precipitate to prepare a conductive mixed liquid; and an isocyanurate-based compound addition step (c) of adding the isocyanurate-based compound to the conductive mixed liquid.

The aqueous dispersion of the conductive composite in each of the production methods (a) to (c) is obtained by adding a monomer for forming the π-conjugated conductive polymer to an aqueous solution of the polyanion, followed by oxidative polymerization. In addition, a commercially available product may be used as the aqueous dispersion of the conductive composite containing the π-conjugated conductive polymer and the polyanion.

Freeze-drying or spray-drying is preferred as a method of drying the aqueous dispersion of the conductive composite in the production method (b). A dried product obtained by freeze-drying or spray-drying the aqueous dispersion of the conductive composite is easy to disperse in the organic solvent.

In the production method (b), the amine compound added to the dried product can hydrophobize the conductive composite by being coordinated or bonded to an anion group of the polyanion, in particular, an excess anion group that is not involved in doping. The hydrophobized conductive composite has enhanced dispersibility in the organic solvent.

After the addition of the amine compound and the organic solvent to the dried product, it is preferred that the mixture be stirred under application of a high shearing force using a high-pressure homogenizer or the like.

The amine compound is a compound having an amino group, and the amino group reacts with an anion group of the polyanion. The amine compound may be any of a primary amine, a secondary amine, a tertiary amine, and a quaternary ammonium salt. In addition, the amine compounds may be used alone or in combination thereof.

The amine compound may have a substituent selected from a linear or branched alkyl group having 2 or more and 12 or less carbon atoms, an aryl group having 6 or more and 12 or less carbon atoms, an aralkyl group having 7 or more and 12 or less carbon atoms, an alkylene group having 2 or more and 12 or less carbon atoms, an arylene group having 6 or more and 12 or less carbon atoms, an aralkylene group having 7 or more and 12 or less carbon atoms, and an oxyalkylene group having 2 or more and 12 or less carbon atoms.

Specific examples of the primary amine include aniline, toluidine, benzylamine, and ethanolamine.

Specific examples of the secondary amine include diethanolamine, dimethylamine, diethylamine, dipropylamine, diphenylamine, dibenzylamine, and dinaphthylamine.

Specific examples of the tertiary amine include triethanolamine, trimethylamine, triethylamine, tripropylamine, tributylamine, trioctylamine, triphenylamine, tribenzylamine, and trinaphthylamine.

Specific examples of the quaternary ammonium salt include a tetramethylammonium salt, a tetraethylammonium salt, a tetrapropylammonium salt, a tetraphenylammonium salt, a tetrabenzylammonium salt, and a tetranaphthylammonium salt. An anion serving as a counterion of ammonium is, for example, a hydroxide ion.

Of those amine compounds, in order that the dispersibility of the conductive composite in the organic solvent may be further enhanced, a tertiary amine is preferred, and tributylamine or trioctylamine is more preferred.

The content ratio of the amine compound is preferably 10 parts by mass or more and 300 parts by mass or less, more preferably 50 parts by mass or more and 150 parts by mass or less with respect to 100 parts by mass of the conductive composite. When the content ratio of the amine compound is equal to or larger than the above-mentioned lower limit value, the dispersibility of the conductive composite in the organic solvent is further enhanced. When the content ratio of the amine compound is equal to or smaller than the above-mentioned upper limit value, a decrease in conductivity can be prevented.

The epoxy compound in the production method (c) can hydrophobize the conductive composite by being coordinated or bonded to an anion group of the polyanion, in particular, an excess anion group that is not involved in doping. The hydrophobized conductive composite has enhanced dispersibility in the organic solvent but has reduced dispersibility in water, and hence the conductive composite that has reacted with the epoxy compound is precipitated in water to give a precipitate. The precipitate is collected by filtration or the like.

The epoxy compound is a compound having an epoxy group, and the epoxy group reacts with an anion group of the polyanion. The epoxy compound does not include a monomer or an oligomer.

Specific examples of the epoxy compound include neopentyl glycol diglycidyl ether, 1,6-hexanediol diglycidyl ether, trimethylolpropane polyglycidyl ether, hexahydrophthalic acid diglycidyl ester, hydrogenated bisphenol A diglycidyl ether, propylene glycol diglycidyl ether, tripropylene glycol diglycidyl ether, polypropylene glycol diglycidyl ether, a fatty acid-modified epoxy, diethylene glycol diglycidyl ether, polyethylene glycol diglycidyl ether, glycerin polyglycidyl ether, diglycerin polyglycidyl ether, polyglycerin polyglycidyl ether, sorbitol-based polyglycidyl ether, ethylene oxide lauryl alcohol glycidyl ether, ethylene oxide phenol glycidyl ether, C12,C13 mixed higher alcohol glycidyl ether, 1,2-epoxy-4-vinylcyclohexane, adipic acid glycidyl ether, and triglycidyl tris(2-hydroxyethyl) isocyanate. Herein, the "C12,C13 mixed higher alcohol glycidyl ether" means an ether formed from a mixture of higher alcohols having 12 and 13 carbon atoms and glycidyl alcohol.

Those epoxy compounds may be used alone or in combination thereof.

The content ratio of the epoxy compound is preferably 10 parts by mass or more and 300 parts by mass or less, more preferably 50 parts by mass or more and 150 parts by mass or less with respect to 100 parts by mass of the conductive composite. When the content ratio of the epoxy compound is equal to or larger than the above-mentioned lower limit value, the dispersibility of the conductive composite in the organic solvent is further enhanced. When the content ratio of the epoxy compound is equal to or smaller than the above-mentioned upper limit value, a decrease in conductivity can be prevented.

<Method of Manufacturing Conductive Film>

As illustrated in FIG. 1, a conductive film 10 of this disclosure includes a film base material 1 and a conductive layer 2 formed from a conductive polymer dispersion.

A method of manufacturing a conductive film according to one aspect of this disclosure includes at least an application step of applying the conductive polymer dispersion described above to at least one surface of a film base material.

According to the method of manufacturing a conductive film, a conductive film including the film base material and a conductive layer formed on at least one surface of the film base material is obtained.

As the film base material, a plastic film may be used.

A resin for the film base material for forming the plastic film is, for example, an ethylene-methyl methacrylate copolymer resin, an ethylene-vinyl acetate copolymer resin, polyethylene, polypropylene, polystyrene, polyvinyl chloride, polyvinyl alcohol, polyethylene terephthalate, polybutylene terephthalate, polyethylene naphthalate, polyacrylate, polycarbonate, polyvinylidene fluoride, polyarylate, a styrene-based elastomer, a polyester-based elastomer, polyethersulfone, polyetherimide, polyether ether ketone, polyphenylene sulfide, polyimide, cellulose triacetate, or cellulose acetate propionate. Of those resins for the film base material, polyethylene terephthalate is preferred from the viewpoints of being inexpensive and excellent in mechanical strength.

The average thickness of the film base material for forming the conductive film is preferably from 5 μm to 400 μm, more preferably from 10 μm to 200 μm. When the average thickness of the film base material for forming the conductive film is equal to or larger than the above-mentioned lower limit value, breakage is less liable to occur. When the average thickness is equal to or smaller than the above-mentioned upper limit value, sufficient flexibility as a film can be secured.

Herein, the average thickness is a value obtained by measuring thicknesses at ten random sites with a thickness gauge, and averaging the measured values.

(Conductive Layer)

The conductive layer contains a conductive composite containing a π-conjugated conductive polymer and a polyanion, and the isocyanurate-based compound.

The average thickness of the conductive layer is preferably 10 nm or more and 5,000 nm or less, more preferably 20 nm or more and 1,000 nm or less, still more preferably 30 nm or more and 500 nm or less. When the average thickness of the conductive layer is equal to or larger than the above-mentioned lower limit value, sufficiently high conductivity can be exhibited. When the average thickness of the conductive layer is equal to or smaller than the above-mentioned upper limit value, the conductive layer can easily be formed.

As a method of applying the conductive polymer dispersion in the application step, for example, there may be applied: an application method involving using a coater, such as a gravure coater, a roll coater, a curtain flow coater, a spin coater, a bar coater, a reverse coater, a kiss coater, a fountain coater, a rod coater, an air doctor coater, a knife coater, a blade coater, a cast coater, or a screen coater; a spray method involving using a sprayer, such as an air spray, an airless spray, or a rotor dampening; or an immersion method, such as dipping.

Of those, a bar coater may be used because the application of the conductive polymer dispersion can be simply performed. The bar coater varies in application thickness depending on its kind. A commercially available bar coater is given a number according to its kind, and as the number increases, a larger thickness can be achieved by the application.

When the conductive polymer dispersion does not contain the binder component, or contains a binder resin formed of a thermoplastic resin as the binder component, after the application step, the applied conductive polymer dispersion is dried so as to remove the dispersion medium, to thereby form the conductive layer. Thus, the conductive film is obtained.

As a method of drying the applied conductive polymer dispersion, there are given heat drying, vacuum drying, and the like. A general method, such as hot-air heating or infrared heating, may be adopted as the heat drying.

When the heat drying is applied, a heating temperature is appropriately set depending on the dispersion medium to be used, and generally falls within the range of from 50° C. or more to 150° C. or less. In this case, the heating temperature is the set temperature of a dryer.

When the conductive polymer dispersion contains a thermosetting monomer or oligomer as the binder component, after the application step, the applied conductive polymer dispersion is heated to be cured, to thereby form the conductive layer. Thus, the conductive film is obtained.

When the conductive polymer dispersion contains a photocurable monomer or oligomer as the binder component, after the application step, the applied conductive polymer dispersion is irradiated with UV light or an electron beam so as to be cured, to thereby form the conductive layer. Thus, the conductive film is obtained.

In the method of manufacturing a conductive film, the conductive polymer dispersion containing the isocyanurate-based compound is used, and hence a conductive film having its temporal decrease in conductivity in the atmosphere sufficiently suppressed and having high basic conductivity can easily be manufactured.

EXAMPLES

Production Example 1

206 g of sodium styrene sulfonate was dissolved in 1,000 ml of ion-exchanged water. While the solution was stirred at 80° C., an oxidant solution of 1.14 g of ammonium persulfate dissolved in advance in 10 ml of water was added dropwise over 20 minutes. The resultant solution was stirred for 12 hours.

To the resultant sodium styrene sulfonate-containing solution, 1,000 ml of sulfuric acid diluted to 10 mass % was added, and about 1,000 ml of the solution was removed from the polystyrene sulfonic acid-containing solution by an ultrafiltration method. 2,000 ml of ion-exchanged water was added to the remaining liquid, and about 2,000 ml of the solution was removed by the ultrafiltration method. The above-mentioned ultrafiltration operation was repeated three times. Further, about 2,000 ml of ion-exchanged water was added to the resultant filtrate, and about 2,000 ml of the solution was removed by the ultrafiltration method.

This ultrafiltration operation was repeated three times.

Water in the resultant solution was removed under reduced pressure to provide polystyrene sulfonic acid as a colorless solid.

Production Example 2

14.2 g of 3,4-ethylenedioxythiophene, and a solution of 36.7 g of polystyrene sulfonic acid in 2,000 ml of ion-exchanged water were mixed with each other at 20° C.

While the thus obtained mixed solution was kept at 20° C. and stirred, an oxidation catalyst solution of 29.64 g of ammonium persulfate and 8.0 g of ferric sulfate in 200 ml of ion-exchanged water was slowly added, and the mixture was subjected to a reaction under stirring for 3 hours.

2,000 ml of ion-exchanged water was added to the resultant reaction liquid, and about 2,000 ml of the solution was removed by the ultrafiltration method. This operation was repeated three times.

Then, to the resultant solution, 200 ml of sulfuric acid diluted to 10 mass % and 2,000 ml of ion-exchanged water were added, and about 2,000 ml of the solution was removed by the ultrafiltration method. 2,000 ml of ion-exchanged water was added to the resultant, and about 2,000 ml of the solution was removed by the ultrafiltration method. This operation was repeated three times.

Further, 2,000 ml of ion-exchanged water was added to the resultant solution, and about 2,000 ml of the solution was removed by the ultrafiltration method. This operation was repeated five times to provide a water dispersion of poly(3,4-ethylenedioxythiophene) doped with 1.2 mass % of polystyrene sulfonic acid (PEDOT-PSS water dispersion).

Production Example 3

1,000 g of the PEDOT-PSS water dispersion was freeze-dried to provide 12 g of a freeze-dried product.

Production Example 4

4.0 g of the freeze-dried product obtained in Production Example 3 and 3.5 g of trioctylamine were added to 1,000 g of isopropanol, and were dispersed therein using a high-pressure homogenizer to provide a conductive mixed liquid.

Production Example 5

To 100 g of the PEDOT-PSS water dispersion obtained in Production Example 2, 300 g of methanol and 25 g of an epoxy compound (Epolight M-1230 manufactured by Kyoeisha Chemical Co., Ltd., C12,C13 mixed higher alcohol glycidyl ether) were added, and the mixture was stirred under heating at 60° C. for 4 hours. During this time, the epoxy compound reacted with sulfonic acid groups of PSS, and hence the sulfonic acid groups disappeared to decrease the water dispersibility of PEDOT-PSS. As a result, PEDOT-PSS was precipitated. The thus formed precipitate was collected by filtration. 1.575 g of the precipitate was added to 315 g of methyl ethyl ketone, and was dispersed therein using a high-pressure homogenizer to provide a conductive mixed liquid.

Example 1

To 10 g of the PEDOT-PSS water dispersion obtained in Production Example 2, 80 g of methanol, 10 g of a binder component (PLAS COAT RZ-105 manufactured by Goo Chemical Co., Ltd., water-dispersed polyester, aqueous solution having a solid content concentration of 25 mass %), and 0.5 g (417 parts by mass with respect to 100 parts by mass of the PEDOT-PSS solid content) of tris(2-carboxyethyl) isocyanurate were added to provide a conductive polymer dispersion.

Subsequently, a No. 2 bar coater was used to coat a polyethylene terephthalate film (manufactured by Toray Industries, Inc., Lumirror T60) with the conductive polymer dispersion to form a coating film.

The coating film was subjected to heat drying at a drying temperature of 120° C. for a drying time of 1 minute to remove the dispersion medium. Thus, a conductive film was obtained.

Comparative Example 1

A conductive film was obtained in the same manner as in Example 1 except that tris(2-carboxyethyl)isocyanurate was not added.

<Evaluation>

A surface resistance value measured within 1 hour after the production of a conductive film (initial surface resistance value), and a surface resistance value after the conductive film had been left to stand under the atmosphere adjusted to a temperature of 25° C. and a humidity of 50% for 15 days (surface resistance value after 15 days) were measured. The measurement results are shown in Table 1.

In the measurement, a resistivity meter (Hiresta manufactured by Mitsubishi Chemical Analytech Co., Ltd.) was used, and an applied voltage was set to 10 V.

The conductive film of Example had a small initial surface resistance value, and besides, had its temporal decrease in conductivity suppressed.

The conductive film of Comparative Example had a large initial surface resistance value, and besides, did not have its temporal decrease in conductivity suppressed.

TABLE 1

| | | Surface resistance ($\Omega/\square$) | | |
|---|---|---|---|---|
| | Isocyanurate-based compound | Initial R0 | After 15 days R1 | R1/R0 |
| Example 1 | Tris(2-carboxyethyl) isocyanurate | $3.0 \times 10^9$ | $3.0 \times 10^9$ | 1 |
| Comparative Example 1 | Absent | $6.0 \times 10^9$ | $1.0 \times 10^{10}$ | 1.7 |

Example 2

To 81.25 g of the conductive mixed liquid obtained in Production Example 4, 3.75 g of urethane acrylate (Art Resin UN-904M manufactured by Negami Chemical Industrial Co., Ltd., methyl ethyl ketone solution having a solid content concentration of 80 mass %), 15 g of diacetone alcohol, 0.075 g of a photopolymerization initiator (IRGACURE 127 manufactured by BASF), and 0.3 g (92.3 parts by mass with respect to 100 parts by mass of the PEDOT-PSS solid content) of tris(2-acryloyloxyethyl)isocyanurate were added to provide a conductive polymer dispersion.

Subsequently, a No. 2 bar coater was used to coat a polyethylene terephthalate film (manufactured by Toray Industries, Inc., Lumirror T60) with the conductive polymer dispersion to form a coating film.

The coating film was subjected to heat drying at a drying temperature of 120° C. for a drying time of 1 minute to remove the dispersion medium. Thus, a conductive film was obtained.

Comparative Example 2

A conductive film was obtained in the same manner as in Example 2 except that tris(2-acryloyloxyethyl)isocyanurate was not added.
<Evaluation>
A surface resistance value measured within 1 hour after the production of a conductive film (initial surface resistance value), and a surface resistance value after the conductive film had been left to stand under the atmosphere adjusted to a temperature of 25° C. and a humidity of 50% for 5 days (surface resistance value after 5 days) were measured. The measurement results are shown in Table 2.

In the measurement, a resistivity meter (Hiresta manufactured by Mitsubishi Chemical Analytech Co., Ltd.) was used, and an applied voltage was set to 10 V.

The conductive film of Example had a small initial surface resistance value, and besides, had its temporal decrease in conductivity suppressed.

The conductive film of Comparative Example had a large initial surface resistance value, and besides, did not have its temporal decrease in conductivity suppressed.

TABLE 2

| | Isocyanurate-based compound | Surface resistance ($\Omega/\square$) | | R1/R0 |
|---|---|---|---|---|
| | | Initial R0 | After 5 days R1 | |
| Example 2 | Tris(2-acryloyl-oxyethyl)isocyanurate | $2.0 \times 10^8$ | $3.0 \times 10^9$ | 15 |
| Comparative Example 2 | Absent | $6.0 \times 10^8$ | $1.0 \times 10^{12} \leq$ | $1,667 \leq$ |

Example 3

To 85 g of the conductive mixed liquid obtained in Production Example 5, 15 g of polyester (VYLON 240 manufactured by Toyobo Co., Ltd., methyl ethyl ketone solution having a solid content concentration of 20 mass %) and 0.3 g (70.6 parts by mass with respect to 100 parts by mass of the PEDOT-PSS solid content) of tris(2-hydroxyethyl) isocyanurate were added to provide a conductive polymer dispersion.

Subsequently, a No. 2 bar coater was used to coat a polyethylene terephthalate film (manufactured by Toray Industries, Inc., Lumirror T60) with the conductive polymer dispersion to form a coating film.

The coating film was subjected to heat drying at a drying temperature of 120° C. for a drying time of 1 minute to remove the dispersion medium. Thus, a conductive film was obtained.

Example 4

A conductive film was obtained in the same manner as in Example 3 except that the addition amount of tris(2-hydroxyethyl)isocyanurate was changed to 0.6 g (141 parts by mass with respect to 100 parts by mass of the PEDOT-PSS solid content).

Comparative Example 3

A conductive film was obtained in the same manner as in Example 3 except that tris(2-hydroxyethyl)isocyanurate was not added.
<Evaluation>
A surface resistance value measured within 1 hour after the production of a conductive film (initial surface resistance value), and a surface resistance value after the conductive film had been left to stand under the atmosphere adjusted to a temperature of 25° C. and a humidity of 50% for 5 days (surface resistance value after 5 days) were measured. The measurement results are shown in Table 3.

In the measurement, a resistivity meter (Hiresta manufactured by Mitsubishi Chemical Analytech Co., Ltd.) was used, and an applied voltage was set to 10 V.

Each of the conductive films of Examples had a small initial surface resistance value, and besides, had its temporal decrease in conductivity suppressed.

The conductive film of Comparative Example had a large initial surface resistance value, and besides, did not have its temporal decrease in conductivity suppressed.

TABLE 3

| | Isocyanurate-based compound | Surface resistance ($\Omega/\square$) | | R1/R0 |
|---|---|---|---|---|
| | | Initial R0 | After 15 days R1 | |
| Example 3 | Tris(2-hydroxyethyl) isocyanurate | $2.0 \times 10^7$ | $5.0 \times 10^7$ | 2.5 |
| Example 4 | | $2.0 \times 10^7$ | $3.0 \times 10^7$ | 1.5 |
| Comparative Example 3 | Absent | $3.0 \times 10^7$ | $1.0 \times 10^8$ | 3.3 |

Example 5

To 4.5 g of the conductive mixed liquid obtained in Production Example 5, 15 g of an addition-curable silicone (KS-3703T manufactured by Shin-Etsu Chemical Co., Ltd., solid content concentration: 30 mass %, toluene solution), 25.5 g of toluene, 58.5 g of methyl ethyl ketone, 0.03 g of a platinum catalyst for curing (CAT-PL-50T manufactured by Shin-Etsu Chemical Co., Ltd.), and 0.09 g (400 parts by mass with respect to 100 parts by mass of the PEDOT-PSS solid content) of triallyl isocyanurate were added to provide a conductive polymer dispersion.

Subsequently, a No. 8 bar coater was used to coat a polyethylene terephthalate film (manufactured by Toray Industries, Inc., Lumirror T60) with the conductive polymer dispersion to form a coating film.

The coating film was heated at a temperature of 150° C. for a time period of 1 minute to be dried and cured. Thus, a conductive film was obtained.

Comparative Example 4

A conductive film was obtained in the same manner as in Example 5 except that triallyl isocyanurate was not added.
<Evaluation>
A surface resistance value measured within 1 hour after the production of a conductive film (initial surface resistance value), and a surface resistance value after the conductive film had been left to stand under the atmosphere adjusted to a temperature of 25° C. and a humidity of 50% for 1 day (surface resistance value after 1 day) were measured. The measurement results are shown in Table 4. In addition, the surface of a conductive layer after its formation was strongly rubbed with the pad of a finger, and then the state of the surface was visually observed. The result of the observation is also shown in Table 4.

In the measurement, a resistivity meter (Hiresta manufactured by Mitsubishi Chemical Analytech Co., Ltd.) was used, and an applied voltage was set to 10 V.

The conductive film of Example had a small initial surface resistance value, and besides, had its temporal decrease in conductivity suppressed.

The conductive film of Comparative Example had a large initial surface resistance value, and besides, did not have its temporal decrease in conductivity suppressed.

TABLE 4

|  | Isocyanurate-based compound | Surface resistance ($\Omega/\square$) Initial R0 | After 1 day R1 | R1/R0 | Surface state after rubbing |
|---|---|---|---|---|---|
| Example 5 | Triallyl isocyanurate | $5.0 \times 10^9$ | $3.0 \times 10^{10}$ | 6 | Not changed |
| Comparative Example 4 | Absent | $1.0 \times 10^{10}$ | $1.0 \times 10^{12} \leq$ | $100 \leq$ | Slightly turned white |

Example 6

To 100 g of the conductive mixed liquid obtained in Production Example 5, 0.1 g (20 parts by mass with respect to 100 parts by mass of the PEDOT-PSS solid content) of tris(2-carboxyethyl) isocyanurate was added to provide a conductive polymer dispersion.

Subsequently, a No. 2 bar coater was used to coat a polyethylene terephthalate film (manufactured by Toray Industries, Inc., Lumirror T60) with the conductive polymer dispersion to form a coating film.

The coating film was subjected to heat drying at a drying temperature of 120° C. for a drying time of 1 minute to remove the dispersion medium. Thus, a conductive film was obtained.

Example 7

A conductive film was obtained in the same manner as in Example 6 except that tris(2-carboxyethyl)isocyanurate was changed to triallyl isocyanurate.

Example 8

A conductive film was obtained in the same manner as in Example 6 except that tris(2-carboxyethyl)isocyanurate was changed to tris(2-hydroxyethyl)isocyanurate.

Example 9

A conductive film was obtained in the same manner as in Example 6 except that tris(2-carboxyethyl)isocyanurate was changed to triglycidyl isocyanurate.

Example 10

A conductive film was obtained in the same manner as in Example 6 except that tris(2-carboxyethyl)isocyanurate was changed to tris(2-acryloyloxyethyl)isocyanurate.

Example 11

A conductive film was obtained in the same manner as in Example 6 except that tris(2-carboxyethyl)isocyanurate was changed to tris(3-trimethoxysilylpropyl)isocyanurate.

Comparative Example 5

A conductive film was obtained in the same manner as in Example 6 except that tris(2-carboxyethyl)isocyanurate was not added.

<Evaluation>

A surface resistance value measured within 1 hour after the production of a conductive film (initial surface resistance value), and a surface resistance value after the conductive film had been left to stand under the atmosphere adjusted to a temperature of 25° C. and a humidity of 50% for 5 days (surface resistance value after 5 days) were measured. The measurement results are shown in Table 5.

In the measurement, a resistivity meter (Hiresta manufactured by Mitsubishi Chemical Analytech Co., Ltd.) was used, and an applied voltage was set to 10 V.

Each of the conductive films of Examples had a small initial surface resistance value, and besides, had its temporal decrease in conductivity suppressed.

The conductive film of Comparative Example had a large initial surface resistance value, and besides, did not have its temporal decrease in conductivity suppressed.

TABLE 5

|  | Isocyanurate-based compound | Surface resistance ($\Omega/\square$) Initial R0 | After 5 days R1 | R1/R0 |
|---|---|---|---|---|
| Example 6 | Tris(2-carboxyethyl)iso-cyanurate | $5.0 \times 10^5$ | $2.0 \times 10^6$ | 4 |
| Example 7 | Triallyl isocyanurate | $5.0 \times 10^5$ | $5.0 \times 10^6$ | 10 |
| Example 8 | Tris(2-hydroxyethyl)iso-cyanurate | $6.0 \times 10^5$ | $3.0 \times 10^6$ | 5 |
| Example 9 | Triglycidyl isocyanurate | $5.0 \times 10^5$ | $2.0 \times 10^6$ | 4 |
| Example 10 | Tris(2-acryloyloxyethyl) isocyanurate | $4.0 \times 10^5$ | $3.0 \times 10^6$ | 7.5 |
| Example 11 | Tris(3-trimethoxy-silylpropyl)isocyanurate | $4.0 \times 10^5$ | $2.0 \times 10^6$ | 5 |
| Comparative Example 5 | Absent | $1.0 \times 10^6$ | $1.0 \times 10^8$ | 100 |

INDUSTRIAL APPLICABILITY

According to the conductive polymer dispersion of this disclosure, a conductive layer having its temporal decrease in conductivity in the atmosphere sufficiently suppressed and having high basic conductivity can easily be formed.

According to the method of producing a conductive polymer dispersion of this disclosure, the above-mentioned conductive polymer dispersion can easily be produced.

According to the method of manufacturing a conductive film of this disclosure, a conductive film having its temporal decrease in conductivity in the atmosphere sufficiently suppressed and having high basic conductivity can easily be manufactured.

The invention claimed is:

1. A conductive polymer dispersion, comprising:
   a conductive composite containing a π-conjugated conductive polymer and a polyanion having an excess anion group that does not contribute to doping and has been reacted with an amine compound or an epoxy compound;
   an isocyanurate-based compound represented by the following formula (1); and
   a dispersion medium for dispersing the conductive composite:

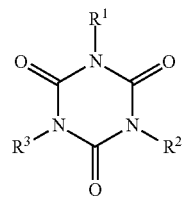

(1)

in the formula (1), $R^1$, $R^2$, and $R^3$ each independently represent a hydrogen atom or a substituent selected from the group consisting of an alkyl group having 1 to 100 carbon atoms, an alkoxy group having 1 to 100 carbon atoms, and an aryl group having 6 to 100 carbon atoms, and the substituent may have a (meth)acryloyloxy group, a carboxy group, a hydroxy group, an amino group, or a trialkoxysilyl group.

2. The conductive polymer dispersion according to claim 1, further comprising a binder component.

3. The conductive polymer dispersion according to claim 2, wherein the binder component comprises a water-dispersible resin.

4. The conductive polymer dispersion according to claim 2, wherein the binder component comprises an acrylic monomer or an acrylic oligomer.

5. The conductive polymer dispersion according to claim 2, wherein the binder component comprises a curable silicone.

6. The conductive polymer dispersion according to claim 1, wherein the π-conjugated conductive polymer comprises poly(3,4-ethylenedioxythiophene).

7. The conductive polymer dispersion according to claim 1, wherein the polyanion comprises polystyrene sulfonic acid.

8. A method of manufacturing a conductive film, comprising applying the conductive polymer dispersion of claim 1 to at least one surface of a film base material.

9. The conductive polymer dispersion according to claim 1, wherein the isocyanurate-based compound comprises at least one member selected from the group consisting of tris(2-carboxyethyl)isocyanurate, tris(2-acryloyloxyethyl) isocyanurate, tris(2-hydroxyethyl)isocyanurate, triallyl isocyanurate, and tris(3-trimethoxysilylpropyl)isocyanurate.

10. The conductive polymer dispersion according to claim 1, wherein a content of the isocyanurate-based compound is 1 to 10,000 parts by mass with respect to 100 parts by mass of the conductive composite.

11. A conductive polymer dispersion, comprising:
    a conductive composite containing a π-conjugated conductive polymer and a polyanion having an excess anion group that does not contribute to doping and has been reacted with an amine compound or an epoxy compound;
    an isocyanurate-based compound represented by the following formula (1); and
    a dispersion medium containing an organic solvent for dispersing the conductive composite:

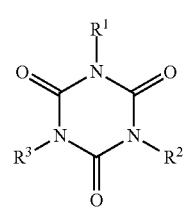

(1)

in the formula (1), $R^1$, $R^2$, and $R^3$ each independently represent a hydrogen atom or a substituent.

12. A method of producing a conductive polymer dispersion, comprising adding an isocyanurate-based compound represented by the following formula (1) to an aqueous dispersion of a conductive composite containing π-conjugated conductive polymer and a polyanion having an excess anion group that does not contribute to doping and has been reacted with an amine compound or an epoxy compound:

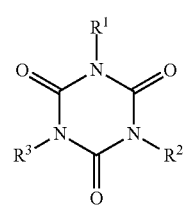

(1)

in the formula (1), $R^1$, $R^2$, and $R^3$ each independently represent a hydrogen atom or a substituent selected from the group consisting of an alkyl group having 1 to 100 carbon atoms, an alkoxy group having 1 to 100 carbon atoms, and an aryl group having 6 to 100 carbon atoms, and the substituent may have a (meth)acryloyloxy group, a carboxy group, a hydroxy group, an amino group, or a trialkoxysilyl group.

13. The method of producing a conductive polymer dispersion according to claim 12, wherein the π-conjugated conductive polymer comprises poly(3,4-ethylenedioxythiophene).

14. The method of producing a conductive polymer dispersion according to claim 12, wherein the polyanion comprises polystyrene sulfonic acid.

15. A method of producing a conductive polymer dispersion, comprising:
    drying an aqueous dispersion of a conductive composite containing a π-conjugated conductive polymer and a polyanion to obtain a dried product, wherein a polyanion has an excess anion group that does not contribute to doping;

adding an amine compound and an organic solvent to the dried product to prepare a conductive mixed liquid, wherein the excess anion group has been reacted with an amine compound; and adding an isocyanurate-based compound represented by the following formula (1) to the conductive mixed liquid:

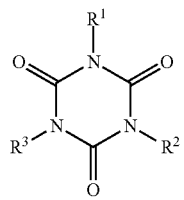

(1)

in the formula (1), $R^1$, $R^2$, and $R^3$ each independently represent a hydrogen atom or a substituent.

16. A method of producing a conductive polymer dispersion, comprising:

adding an epoxy compound to an aqueous dispersion of a conductive composite containing π-conjugated conductive polymer and a polyanion having an excess anion group that does not contribute to doping and has been reacted with an amine compound or an epoxy compound to precipitate the conductive composite, to thereby form a precipitate;

collecting the precipitate;

adding an organic solvent to the collected precipitate to prepare a conductive mixed liquid; and adding an isocyanurate-based compound represented by the following formula (1) to the conductive mixed liquid:

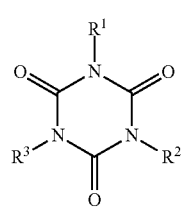

(1)

in the formula (1), $R^1$, $R^2$, and $R^3$ each independently represent a hydrogen atom or a substituent selected from the group consisting of an alkyl group having 1 to 100 carbon atoms, an alkoxy group having 1 to 100 carbon atoms, and an aryl group having 6 to 100 carbon atoms, and the substituent may have a (meth)acryloyloxy group, a carboxy group, a hydroxy group, an amino group, or a trialkoxysilyl group.

* * * * *